(12) United States Patent
El Dokor et al.

(10) Patent No.: US 11,321,864 B1
(45) Date of Patent: May 3, 2022

(54) USER GUIDED MODE FOR MEASUREMENT PURPOSES

(71) Applicant: Edge 3 Technologies, Inc., Phoenix, AZ (US)

(72) Inventors: Tarek El Dokor, Phoenix, AZ (US); Jordan Cluster, Tempe, AZ (US); James Holmes, Mesa, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 0 days.

(21) Appl. No.: 16/183,702

(22) Filed: Nov. 7, 2018

Related U.S. Application Data

(60) Provisional application No. 62/579,831, filed on Oct. 31, 2017.

(51) Int. Cl.
| | | |
|---|---|---|
| *G06T 7/60* | (2017.01) | |
| *H04N 5/232* | (2006.01) | |
| *G06F 3/0488* | (2013.01) | |
| *G06F 3/0484* | (2013.01) | |
| *G01B 11/02* | (2006.01) | |
| *G06T 7/50* | (2017.01) | |
| *G06F 3/0481* | (2013.01) | |
| *G06F 3/04845* | (2022.01) | |
| *G06F 3/04847* | (2022.01) | |
| *G06F 3/04842* | (2022.01) | |
| *G06F 3/04817* | (2022.01) | |

(52) U.S. Cl.
CPC ............ *G06T 7/60* (2013.01); *G01B 11/022* (2013.01); *G06F 3/0488* (2013.01); *G06F 3/04845* (2013.01); *G06F 3/04847* (2013.01); *G06T 7/50* (2017.01); *H04N 5/23293* (2013.01); *G06F 3/04817* (2013.01); *G06F 3/04842* (2013.01); *G06T 2207/10028* (2013.01); *G06T 2207/20104* (2013.01)

(58) Field of Classification Search
CPC ... G06T 7/60; G06T 7/50; G06T 2207/10028; G06T 2207/20104; G01B 11/022; G06F 3/04845; G06F 3/04847; G06F 3/0488; G06F 3/04817; G06F 3/04842; H04N 5/23293
See application file for complete search history.

(56) References Cited

U.S. PATENT DOCUMENTS

| | | | | |
|---|---|---|---|---|
| 2009/0039167 | A1* | 2/2009 | Wang | G01B 11/02 235/462.42 |
| 2013/0293539 | A1* | 11/2013 | Hunt | G06T 17/20 345/420 |

(Continued)

*Primary Examiner* — Dakshesh D Parikh
(74) *Attorney, Agent, or Firm* — Gordon Kessler

(57) ABSTRACT

A method and system for dimensioning an object are provided. A system for dimensioning an object includes a camera associated with a dimensioning device for acquiring an image of a scene including an object to be dimensioned, and a display associated with the dimensioning device for displaying the scene acquired by the camera. A first indicator is displayed on the display indicative of a first desired position of the object to be dimensioned, and a second indicator is displayed on the display indicative of a second desired position of the object to be dimensioned. A processor is provided for receiving the scene acquired by the camera, the first indicator, and the second indicator, and for determining one or more dimensions of the object to be dimensioned.

4 Claims, 10 Drawing Sheets

(56) References Cited

U.S. PATENT DOCUMENTS

| | | | |
|---|---|---|---|
| 2013/0308013 A1* | 11/2013 | Li ........................ | G01B 11/24 |
| | | | 348/231.3 |
| 2014/0104414 A1* | 4/2014 | McCloskey ............ | G06Q 30/04 |
| | | | 348/135 |
| 2014/0297678 A1* | 10/2014 | Algreatly .......... | G06F 16/90335 |
| | | | 707/769 |

* cited by examiner 910    920

1010

USER GUIDED MODE FOR MEASUREMENT PURPOSES

CROSS REFERENCE TO RELATED APPLICATIONS

This application claims the benefit of U.S. Provisional Patent Application No. 62/579,831, filed Oct. 31, 2017 to El Dokor et al., titled "User Guided Mode for Measurement Purposes", the entire contents thereof being incorporated herein by reference.

BACKGROUND

A mobile dimensioning device is a device that can measure any object's dimensions (length, width, height) within a given tolerance setting or set of settings. The inventors of the present invention have recognized that such a device would replace the need for a measuring tape, allow for fast and accurate measurements, and for a more streamlined logistics workflow environment. It would therefore be beneficial to provide such a device.

SUMMARY

A device is considering a mobile dimensioning device if it is operated using a mobile computer. The device itself is preferably comprised of a stereo camera, a time-of-flight camera, a structured light camera, or other appropriate camera. In some instances, it may be comprised of combinations of these cameras.

The inventors of the present invention have recognized that the engineering challenge associated with successfully dimensioning an object using a mobile dimensioning device stems from the environment in which the device is operating. Such a device will encounter widely varying conditions. These include varying lighting conditions such as outdoor bright with bright sunlight, or indoor lighting in a dim-lit factory. A dimensioning device may be asked to dimension a highly reflective object, or objects with textured backgrounds. It may be asked to dimension an object in a highly camouflaged background. A device may also be asked to deal with motion artifacts and ambiguous dimensioning targets. In many such cases, the mobile dimensioning device may either fail to dimension or may need guidance during the dimensioning process.

In accordance with an embodiment of the invention, a user guidance paradigm has been developed to provide context to a mobile dimensioning system and overcome limitations in interpreting user intent for measuring an object. This embodiment enables correction of detected measurements in real-time or as a post-processing step, which aids in user training and software development. Additionally, a novel approach to obtaining 3D measurements from 2D feedback is provided, utilizing an inventive virtual measuring instrument as an example application. Such a virtual tape measure may be expanded upon to encompass any kind of virtual measurement device.

In accordance with various embodiments of the invention, a mobile dimensioning device may dimension a cuboidal object, shaped mostly like a cube. It may also dimension an irregular object, for instance a cap or a canoe. It may also dimension a pallet or the like. In each of these scenarios, the inventive device preferably may overlay feedback on a screen of the device that makes the overall user experience much more powerful and meaningful. It is further desirable, in accordance with an embodiment of the invention, to make the user experience more interactive, to enhance the accuracy of the device itself, and to better interpret the intent of the operator or user, in terms of what they are trying to measure or dimension.

A user guided mode is therefore provided in accordance with an embodiment of the invention to provide a method for integrating such an interactive interface, to enable user feedback to better guide the system. The guidance is presented for the purposes of better capturing the intent of the user, and hence improving the overall accuracy of the system. Feedback is especially important to better dimension objects in challenging environments, to better disambiguate complex and often challenging dimensioning conditions.

BRIEF DESCRIPTION OF THE DRAWINGS

The invention will be described making reference to the drawings, in which.

DESCRIPTION

This application incorporates by reference the following: U.S. patent application Ser. No. 15/863,952, filed Jan. 7, 2018 to El Dokor et al., titled Collaborative Disparity Decomposition, pending, which is a continuation of U.S. patent application Ser. No. 14/628,278, filed Feb. 22, 2015 to El Dokor, et al., titled Orthogonal and Collaborative Disparity Decomposition, now U.S. Pat. No. 9,865,045, which claims the benefit of U.S. Provisional Patent Application Ser. No. 61/994,963, filed May 18, 2014 to El Dokor et al., titled "Orthogonal and Collaborative Disparity Decomposition in Structured Manmade Environments", expired, the '278 application also claiming the benefit of U.S. Provisional Patent Application 62/054,398, filed Sep. 24, 2014 to El Dokor et al., titled Orthogonal and Collaborative Disparity Decomposition, expired. The content of each of these applications is hereby incorporated herein by reference in their entirety.

A preferred dimensioning system constructed in accordance with an embodiment of the invention preferably consists of a mobile computing device such as a mobile phone, bar code scanner, or ruggedized terminal. The computing device may contain or may be connected to a depth sensor such as a passive or active stereo camera, a time-of-flight camera, a structured light camera, or other appropriate camera or sensor device. User guidance may preferably be provided by one or more input modalities such as a touch screen, scroll wheel, or voice controls, or a combination of them. For instance, the user may utter the words, "cluttered scene" to describe a scene where the parcel to be dimensioned is found in a cluttered environment, or "busy box" to indicate that the box has too many labels, and many other examples.

In doing so, the user is preferably guiding the mobile dimensioning device to better assess the scene. The operator or user may also utilize a virtual rail or virtual measurement device overlaid on their device. Such a rail is preferably useful for guiding the system to the correct corners of the end of a parcel or package. Once proper indication of the bounds of an object to be measured have been identified, one or more processes for determining the actual dimensions of the object may be employed, such as those described by the present inventors in U.S. Pat. No. 9,865,045, issued Jan. 9, 2018 to El Dokor et al. and related U.S. patent application Ser. No. 15/863,952, filed Jan. 7, 2018 to El Dokor et al., the entire contents of these documents being incorporated herein by reference.

Figure 1:
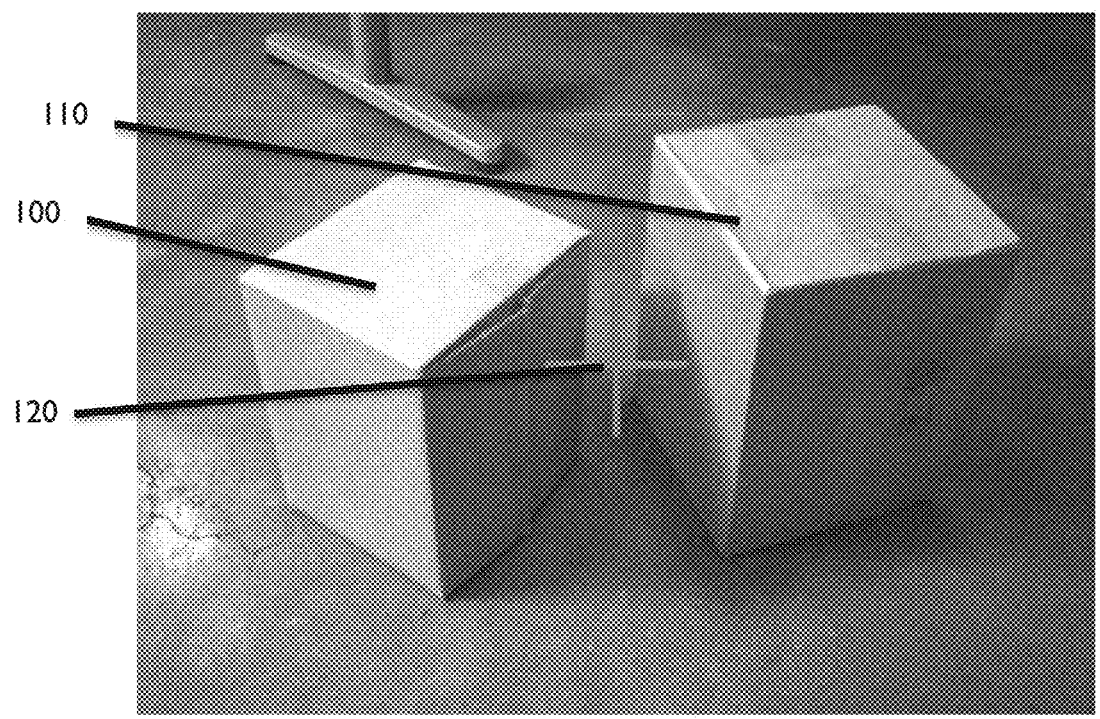
FIG. 1 is an example of an ambiguous dimensioning target.

As mentioned above, a user-guided mode serves multiple purposes in a dimensioning system, including context as to what the user is trying to dimension. For example, FIG. 1 illustrates an ambiguous target situation, where it is unclear if the user intends to dimension the box 100 on the left or the box 110 on the right, so that it is unclear which object target 120 should be applied. While it is possible to establish rules for automatic target selection, such as dimensioning the closest object or the largest object, these rules may not align with user preferences or may be subject to corner cases where multiple targets are valid. In this case, the user may choose to say, "left box", or "right box", or may be provided with an opportunity to select he desired object to be dimensioned through the se of a touch screen or the like.

Figure 2:
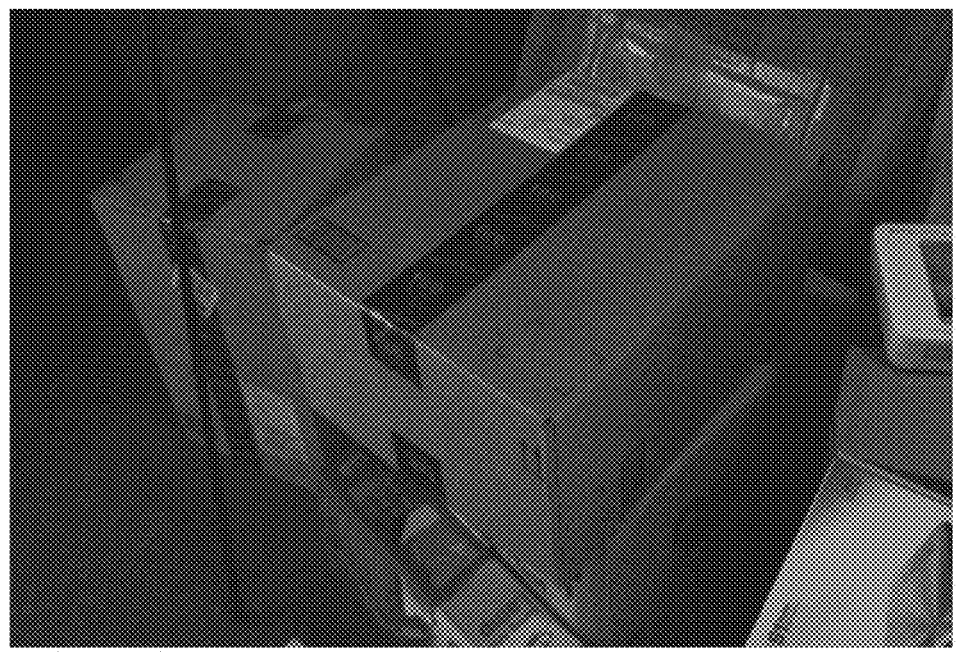
FIG. 2 is an example of a camouflaged box as a dimensioning target.

Furthermore, allowing the user to guide the system, not only provides context, but allows the user to correct the dimensions if a different target from a target that might be automatically selected by the dimensioning device, such as if software cannot interpret the scene. For example if the dimensioning target is found in a cluttered environment, as is depicted in FIG. 2, user input may be required in order to properly identify the desired dimensioning target.

Another key aspect of a user guided mode provided in accordance with an embodiment of the invention is training a new user to operate the system. Allowing a user to interact with a dimensioning tool teaches the user the capabilities of the system and helps the user understand automatic targeting rules of the mobile dimensioning system, while at the same time allowing the user to correct measurements of the mobile dimensioning device. Hence, feedback can be used to flag cases when the measurement system is failing. This information can be logged and used to improve the measurement system either in a real-time feedback loop or future iterations of the software.

User guidance may preferably be provided in many ways, including: 1) seeding measurements, which generally identifies which object to measure, allowing the system to focus on a given object, 2) specifying measurements, which provides additional contextual details on the boundaries of the object to dimension, and 3) adjusting measurements, which modifies or refines measurements after an initial estimate.

Figure 3:
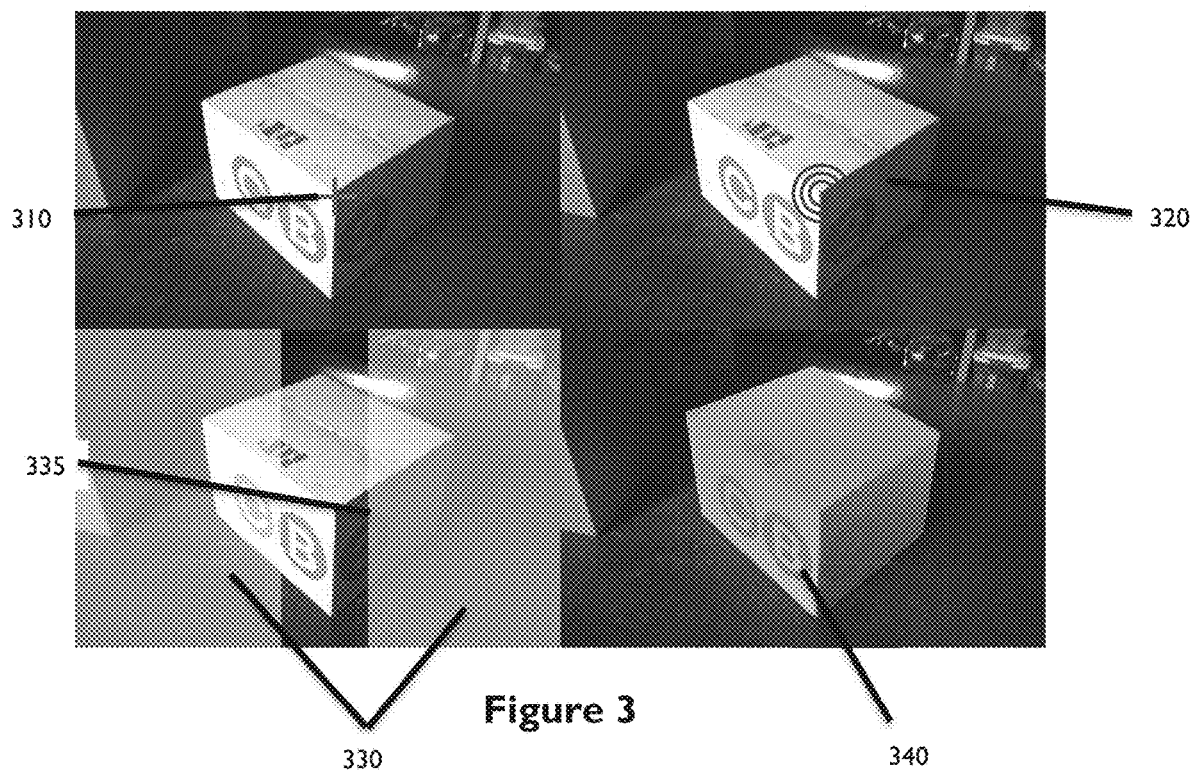
FIG. 3 depicts one or more virtual aiming cues provided in accordance with an embodiment of the invention.

One approach for seeding measurements in accordance with an embodiment of the invention is to provide an aiming icon or other visual cue that the user must align with the dimensioning target, examples of which are depicted in FIG. 3. In these examples, seeding the measurements themselves may be done with a crosshairs 310 indicative of the location of a corner of a target to be dimensioned, for example, a circle 320 also indicative of the location of a corner of a target to be dimensioned, for example, or even a virtual curtain 330 designed to block out areas not intended to be the corner of a target to be dimensioned, leaving such a corner 335 as the desired corner. Note that the bottom right image in FIG. 3 represents an overlay 340 highlighting a virtual bounding box around the object (dimensioning target) itself.

Figure 4:
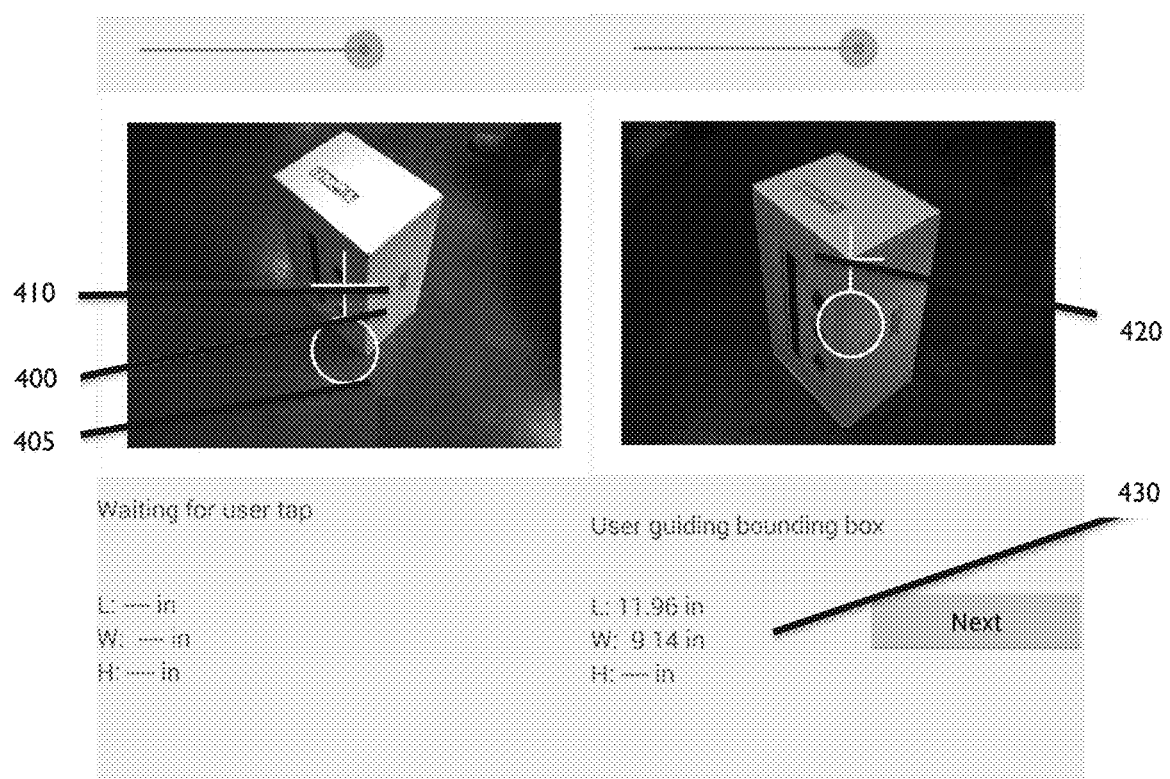
FIG. 4 is an illustration of cross hairs locations before and after user guidance input in accordance with an embodiment of the invention.

This approach may ultimately frustrate the user if aligning the target object is perceived as difficult or time consuming. In an alternative embodiment of the invention, the user may be encouraged to reposition an aiming icon 400, such as dragging and dropping it from an existing location 410 to a new location 420 as shown in FIG. 4. In such a case, the user is preferably given the option to manually guide the system, by repositioning the aiming icon to assist in properly positioning the aiming icon 400 at a proper position (corner) of the target to be dimensioned. As is further shown in FIG. 4, once an aiming icon is placed in a desired position, the apparatus in accordance with the embodiment of the invention may preferably calculate the dimensions of the dimensioning target including the desired position indicated by the aiming icon 400, and may display the dimensions of the target to be dimensioned at a location 430 of a display of the mobile dimensioning system.

Hardware controls, such as a scroll wheel, or software controls, such as a touch screen, may be utilized to reposition the aiming icon. It is important to note, however, that if a touch screen is used, the user's hand may obscure the icon, making it difficult to see the initial and final position of such an icon. To remedy this, an offset may be added to the touch controls, potentially in the form of a handle, so the user can touch below or beside the icon. FIG. 4 provides such an example with a circular handle 405 extending below the aiming crosshairs of aiming icon 400.

Figure 5:
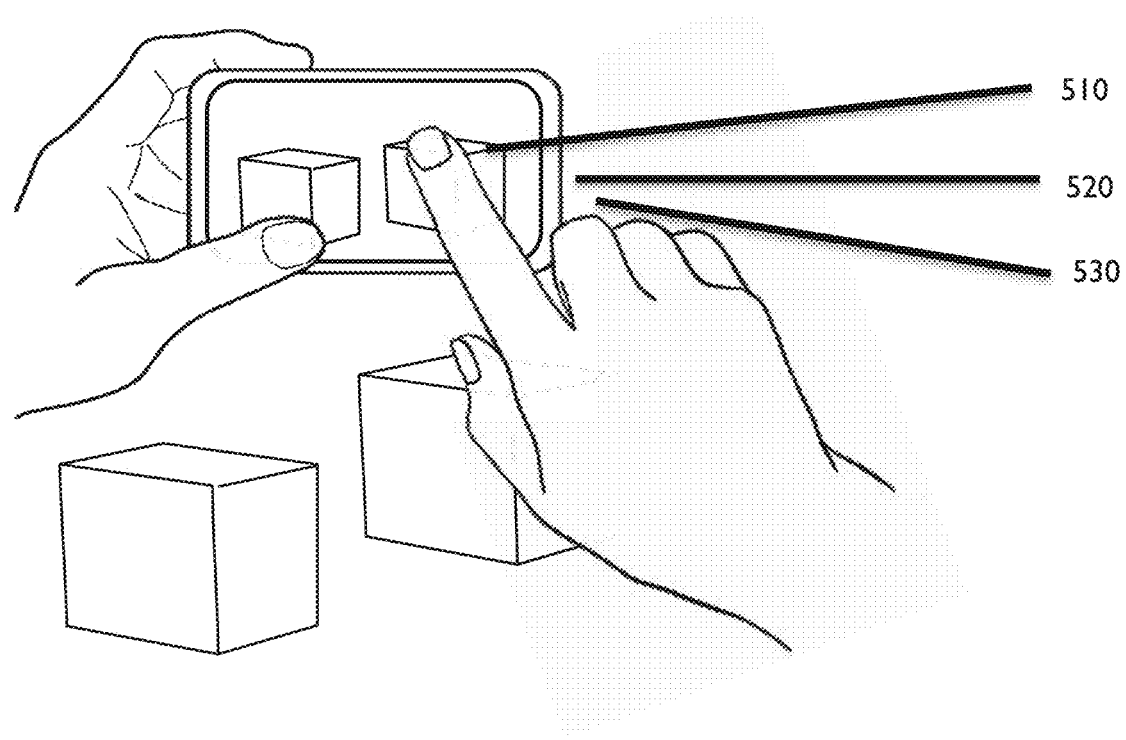
FIG. 5 is an example of a user selecting a dimensioning target in accordance with an embodiment of the invention.

Alternatively, as is shown in FIG. 5, in place of an aiming icon, the user may seed dimensioning with touch gestures, for example, tapping on the relevant dimensioning target. This allows the system to very quickly and efficiently dimension a given object. Therefore, as is shown, the user may preferably use a hand 510 to select a desired position (corner) of a target to be dimensioned by tapping on a display 520 of a mobile dimensioning system 530.

In some cases, particularly scenes with poor lighting, contrast, or image quality additional user interaction may be preferred to find a camouflaged box. In this case, the user may preferably specify the boundaries of the object to dimension or guide the system to another conclusion using voice commands. Alternatively, the user may interactively guide the system.

Figure 6:
FIG. 6 is an example of a process for defining of a dimensioning target outline in accordance with an embodiment of the invention.

FIG. 6 illustrates an example of user specification of the target to be dimensioned, where the user preferably taps along the boundaries of the dimensioning target to define a closed path. As is shown in FIG. 6, the user may first tap an edge 610 of object 600, highlighting or otherwise indicating selection of edge 610 of the object 600. The user then may sequentially select edges 620, 630, 640, 650 and 660 to define the contours of the object to be dimensioned. Rather than selecting edge 610 directly, it may also be possible to select sequentially the corners defining edge 610 (and subsequent edges) to define the object to be dimensioned. Such selection may be performed by any of the selection methods noted above, including the user of crosshairs movable by hardware or software controls, or through tapping of a touch screen. This approach greatly narrows the scope of the measurement such that dimensioning occurs only within the specified boundaries. These boundaries also provide clues to features detection algorithms that important dimensioning cues should be present and assist in the process.

Figure 7:
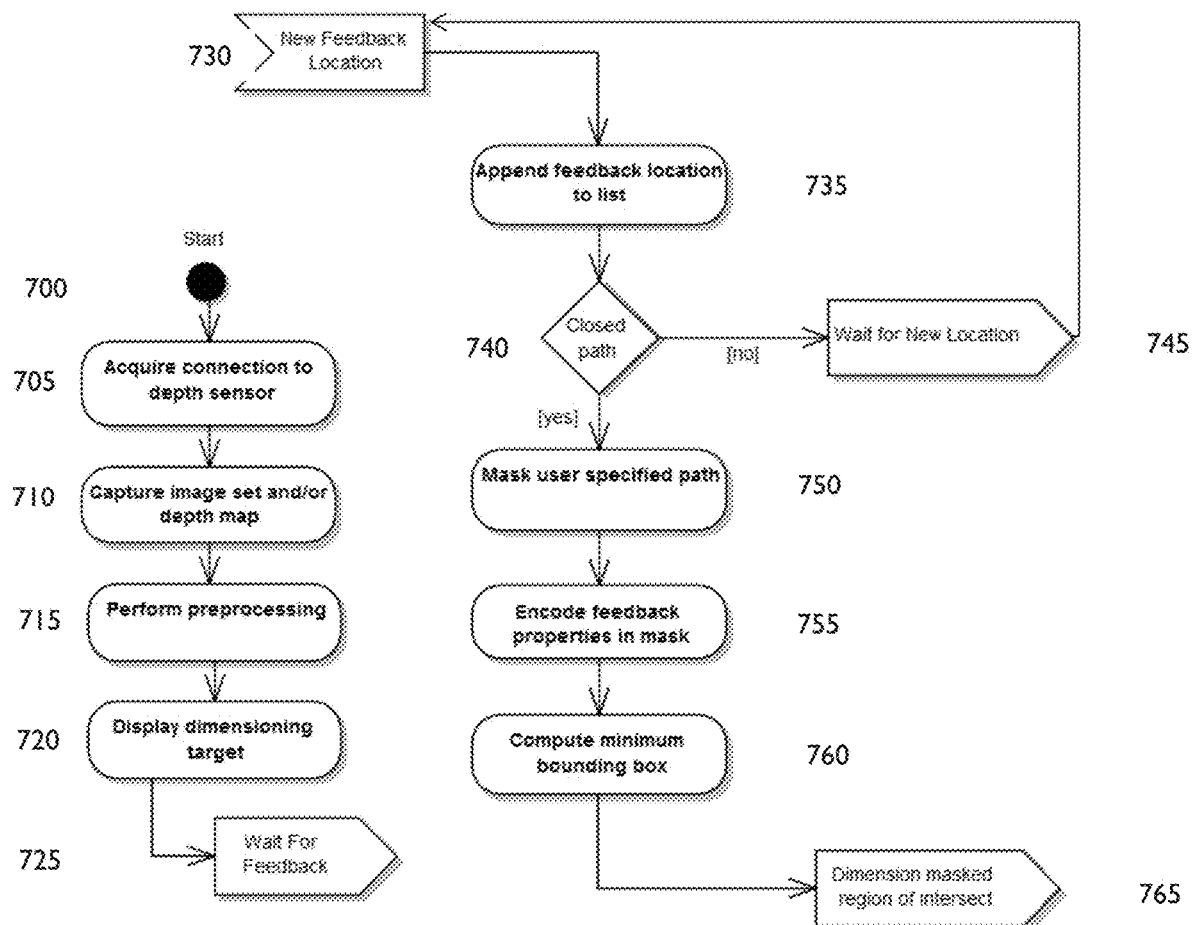
FIG. 7 is flowchart depicting a process for user guided measurement in accordance with an embodiment of the invention.

FIG. 7 provides a flowchart diagram depicting an overview of an example approach for obtaining specific locations to dimension from the user, preferably using a mobile dimensioning device. As shown, processing starts at step 700, and then at step 705 the mobile dimensioning device obtains a connection to a depth sensor, preferably a depth camera of some sort associated with the mobile dimensioning device at step 710. Processing then passes to step 710 where the mobile dimensioning device first collects data from the depth sensor or sensors, in the form of an image set or depth map. This data may then be pre-processed at step 715, potentially computing an initial feature map or triangulating depth values. An indication of a display dimensioning target is then preferably displayed to the user at step 720. The mobile dimensioning device then enters a waiting state at step 725, awaiting input guidance from the user. At step 730, feedback regarding locations of one or more components of a target to be dimensioned are recognized, and then propagated to the system at step 735 until the locations preferably form a closed path, or other appropriate identification of a particular object to be dimensioned is completed. Thus, at step 740, it is inquired whether the input locations form a closed path. If this inquiry is answered in the negative, and it is therefore determined that the input locations do not form a closed path, processing passes to step 745, where the system awaits input of a new location, with processing returning to step 730 when such a location is input. If on the other hand, the inquiry at step 740 is answered in the affirmative, and it is therefore determined that the input locations do form a closed path, processing passes to step 750 where the user specified path is preferably masked out (as in FIG. 6) or otherwise identified, so that the closed path is then used to mask all relevant regions of the input image, potentially encoding feedback properties at step 755, such as edge information in the mask. A minimum bounding box is also fit around the mask at step 760 to isolate a region of intersection for the dimensioning process, and finally at step 765 dimensions of the masked region are provided. This process greatly reduces the computational complexity of the dimensioning process.

Figure 8:
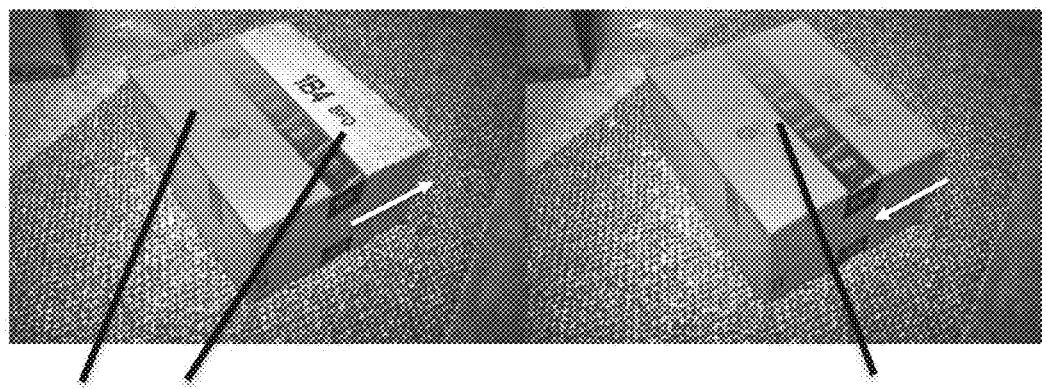
FIG. 8 is an example of dimensioning of a partial surface of a dimensioning target in accordance with an embodiment of the invention.
Figure 9:
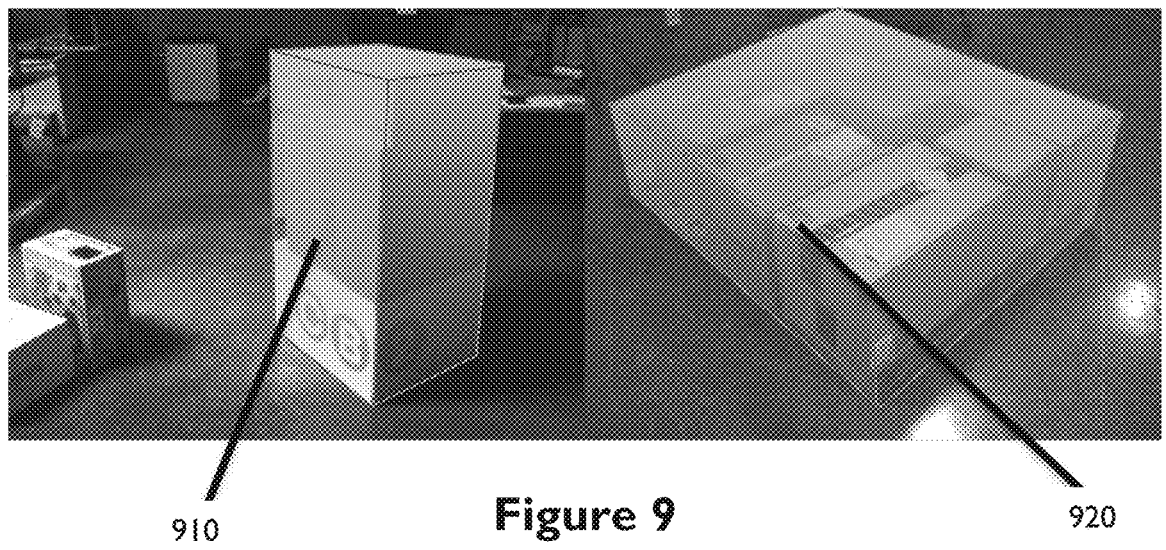
FIG. 9 is an example of dimensioning of multiple dimensioning targets simultaneously.

In accordance with additional embodiments of the invention, dimensioning adjustments may also be made as a post-processing step whenever dimensioning results are less accurate than desired, or otherwise appear to be able to benefit from further input from the user. FIG. 8 highlights an example where the mobile dimensioning unit may have converged on half 810 of the top surface 800 of an object to he dimensioned instead of all of top surface 800. The user may preferably manually adjust the dimensions in a manner as noted above to measure a different part or extent of the target as is depicted (such as shown in FIG. 8, where the highlighted region 820 is preferably coextensive with top surface 800 of the object to be dimensioned). The process of adjusting may also be used as shown in FIG. 9, to allow for the dimensioning of one or more composite or combination objects, including a plurality of objects making up a single object to be dimensioned, to preferably end up with a single cohesive outcome, such as indication 910 or 920, as illustrated in FIG. 9. This feature is particularly useful when dimensioning stacked objects or items arranged on a pallet, or otherwise held together, such as for shipping or storage.

Additionally, the system in accordance with an additional embodiment of the invention may offer more interactivity in the form of a snap-to feature. This means that the user may simply drag the top surface close enough to the corner edge, and that may be sufficient for the system to snap to that location, instead of the user manually moving it there.

Figure 10:
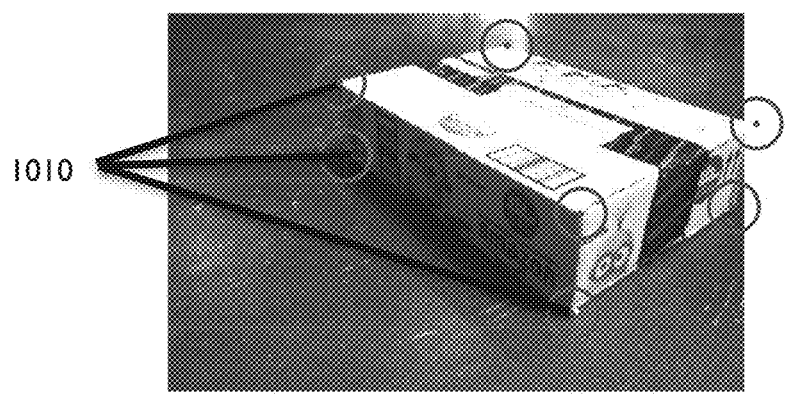
FIG. 10 is an example of provision of guiding dimensions provided off screen in accordance with an embodiment of the invention.

In the case of cuboidal objects, geometric constraints may be combined with user feedback to dimension parts of the object that are obscured or outside the field of view. This is highlighted in FIG. 10, below, in which the mobile dimensioning system may either guide itself or have someone guide it offscreen. As is shown in FIG. 10, if an object to be dimensioned is known to be a cuboid, then expected visible corners may be indicated by indicators 1010, which may be automatically matched to corners, may be moved by a user on a mobile device, or may be moved by a user off screen.

Figure 11:
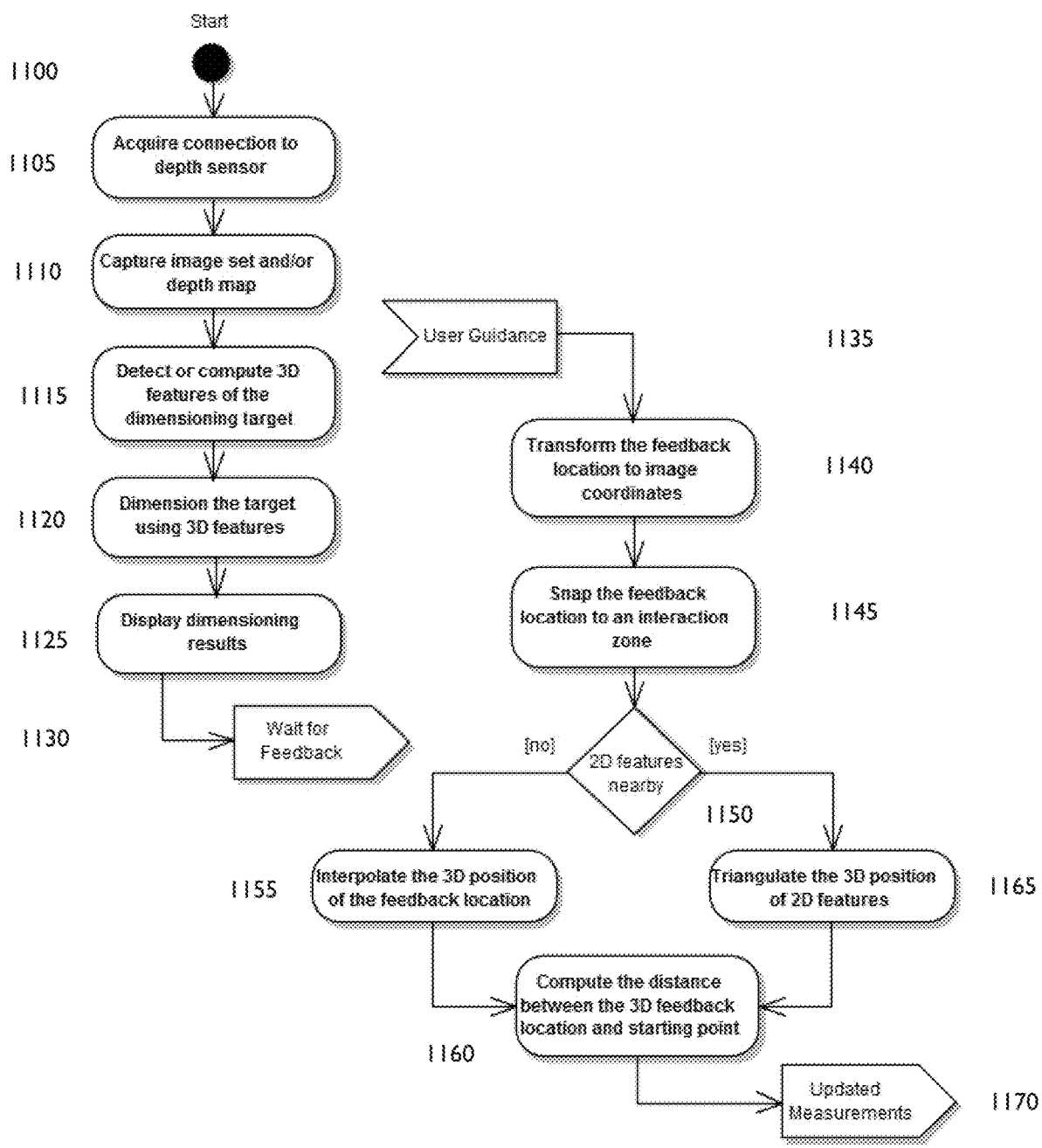
FIG. 11 is a flowchart depicting a process for user guided measurement adjustment in accordance with an embodiment of the invention.

An example approach for adjusting dimensioning measurements is outlined in the flowchart shown in FIG. 11. As noted above with respect to FIG. 7, processing begins at step 1100, and after acquisition of a connection to one or more depth sensors (depth camera by a mobile dimensioning device at step 1105 an image set or depth map is first acquired from the one or more depth sensors at step 1110. An initial feature set is then detected (potentially using targeting feedback from the user) and converted to 3D at step 1115, if the input data is two-dimensional. 3D features are then measured, and the target to be dimensioned is dimensioned using the measured features at step 1120. The initial results are presented for review at step 1125. The system then waits for feedback from the user at step 1130. When user guidance is first received at step 1135, this user feedback is first transformed into image coordinates at step 1140 and then mapped to an interaction zone. The system then searches for a dimensionable feature, such as a corner, edge, or junction within the interaction zone. If one of more features is found near the interaction zone, the system returns the distance between the starting point and the closest or most dominant feature so that the determined such location is indicated as a corner, edge, junction or the like at step 1145. Processing then passes to step 1150 where it is determined whether any 2D features are nearby. If not, processing passes to step 1155 where the 3D position of the feedback location is interpolated. Processing then passes to step 1160 where the distance between the 3D feedback location and the starting point of the selection of the corner edge or junction of the target to be dimensioned is located. Measurements are then updated at step 1170. If yes, processing passes to step 1165 where the 3D position of 2D features is triangulated. Processing then passes to step 1160 where the distance between the 3D feedback location and the starting point of the selection of the corner edge or junction of the target to be dimensioned. Measurements are then updated at step 1170.

The interaction zones allow course gestures to operate as finer controls. In the case of cuboid dimensioning, the interaction zones can be defined as the contours of the box and represented mathematically as a line with slope m and intercept b in an x-y coordinate space.

$$y = mx + b \qquad \text{Equation 1}$$

Accordingly, the point on the line closest to an arbitrary feedback location $(x_1, y_1)$ is the intersection of Equation 1 and a perpendicular line passing through the feedback location:

$$y = \frac{-x}{m} + y_1 + \frac{x_1}{m} \qquad \text{Equation 2}$$

Where the intersection $(x_2, y_2)$ is given:

$$x_2 = \frac{my_1 + x_1 - mb}{m^2 + 1} \qquad \text{Equation 3}$$

$$y_2 = mx_2 + b \qquad \text{Equation 4}$$

If the feedback location is defined in only one view of a multiview camera, then the corresponding location in the opposing view can be found from the intersection of the interaction zone (e.g line) with the epipolar line associated with the known feedback location. Once both locations are known, triangulation can be used to convert the 2D locations to 3D and output real-world measurements. Other approaches to triangulation may also be used as well.

Figure 12:
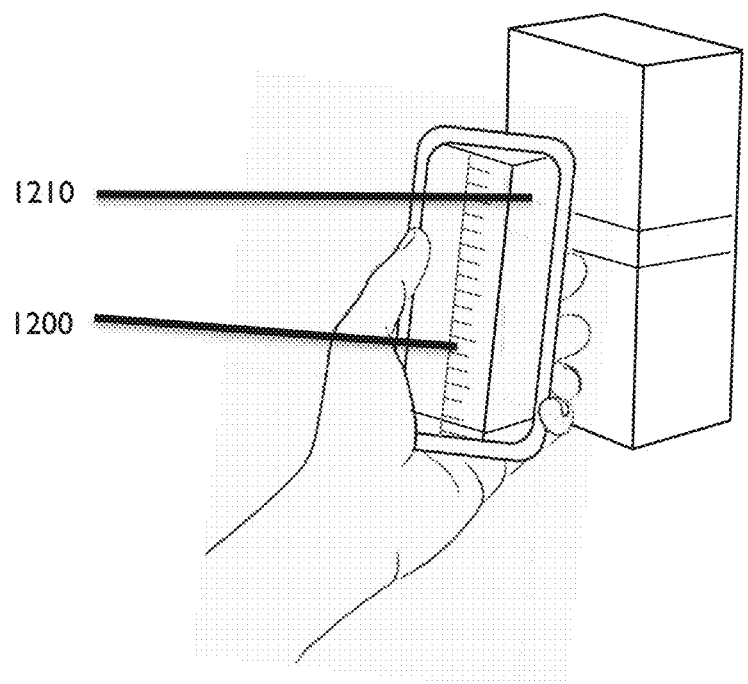
FIG. 12 is an example of a virtual tape measure system in accordance with an embodiment of the invention.

One novel application of user guided dimensioning is a virtual tape measure, where the user can control the extent of an object dimensioned in real-time. FIG. 12 illustrates an example use case where the tape measure 1210 is overlaid on the image of a scene using augmented reality, as displayed on mobile device display 1200.

In this case, for example, the dimensioning system preferably initializes from either a user seeded location of a key feature of the scene. Detected 2D features are then converted to 3D using the available depth sensor and corresponding measurements are reprojected to 2D on virtual tape measure that may automatically adjust to the scene. Measurements are also preferably stored in system memory as the scene presented to the sensor changes. This enables the total dimensions of an object that does not fit in the field of view to be obtained.

The examples presented so far have focused on generic feedback coming from a touch screen or hardware buttons on a mobile compute device, such as a cell phone. There exists, however, multiple other sensors for capturing user feedback. For example, pre-baked and/or natural language voice commands may be utilized to change states or provide context dimensioning software, i.e.

"Start Dimensioning"
"Measure the Box on the Left"
"Find the camouflaged box"
"Activate Mobile Range Finder"
etc.

Figure 13:
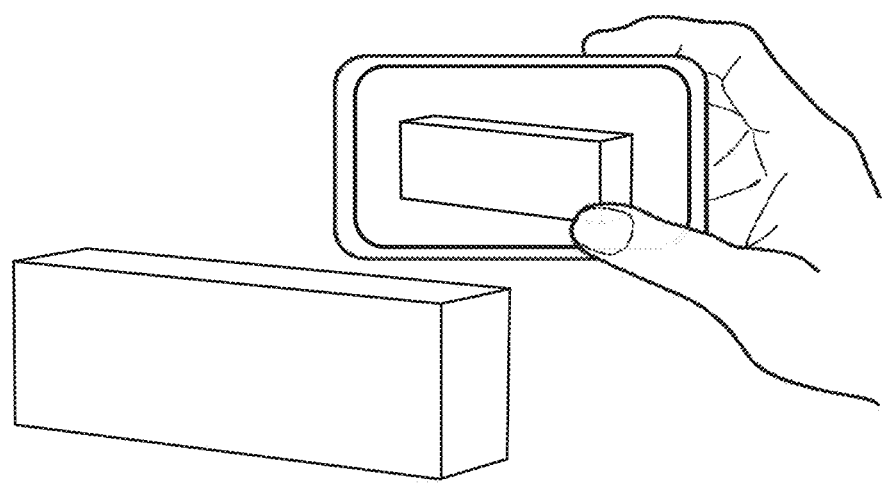
FIG. 13 is an example of the dimensioning of a wide cuboid in accordance with an embodiment of the invention.
Figure 14:
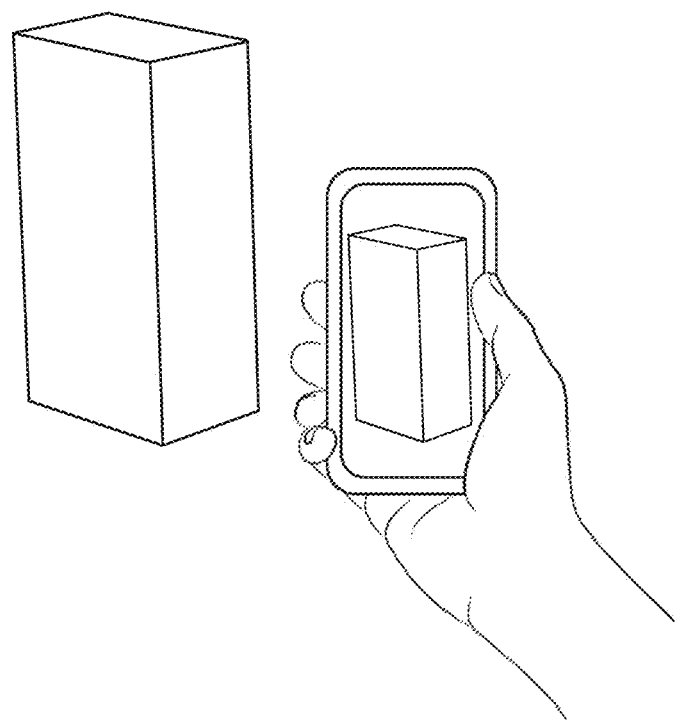
FIG. 14 is an example of the dimensioning of a tall cuboid in accordance with an embodiment of the invention.

As shown in FIG. 13 and FIG. 14, orientation and inertia sensors may be used to toggle modes or provide interpretive cues, such as targeting a wide object when the device is horizontal or tall object when the device is vertical:

Additionally, contextual information about the scene may be obtained from artificial intelligence systems or object classifiers, which may tag the input with an expect shape, such as cuboid, pallet, or irregular or may tag the scene as busy, simple, low contrast, etc. This information can in turn be used to change modes, automate thresholds, define relevant features, or switch algorithms to maintain required performance.

Alternatively, AI-assist may replace user assist with an AI system that may assist the existing system and augment its functionality. An AI system may be trained on pre-annotated sets of images, obtained by saving images from multiple trials. For instance, a deep learner may be used that takes as input a series of images that have been "pre-tapped" by the user, meaning they have been pre-labeled with user-guided mode, fed into an AI as a series of input images. The output of the AI would preferably be able to predict what a user would have guided the system to. This means that any example whereby the user has tapped and successfully been able to guide the system to accurately dimension a box may be used as an example for the AI to train on. The outcome of multiple users, providing a large number of examples would be providing an AI, such as a deep learning AI or a convolutional neural network AI with the ability to predict the position of the tapped locations.

The AI-assist mode can also take as input inertial data and positional data (including from an accelerometer, gyroscopic, or other positioning or directional element) from a mobile dimensioning device. This input may be combined with the tapped locations associated with every user. The outcome is not only be an estimate of where the tapped locations would be but, provided an extensive database, an actual estimate (or tight range) of all three dimensions of a box or parcel. AI-assist mode may be used as an initial input, allowing for user adjustment thereafter, or may be used after user input in order to correct any imprecision in user positioning.

The approaches presented above may easily be expanded to irregular objects or parcels, including tapping to get various objects dimensioned.

In accordance with various embodiments of the invention, the term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any subject matter described in this disclosure or on the scope of what may be claimed, but rather as descriptions of features that may be specific to particular embodiments of the subject matter described in this disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A system for dimensioning an object, comprising:
a camera associated with a dimensioning device for acquiring an image of a scene including an object to be dimensioned;
a display associated with the dimensioning device for displaying the scene acquired by the camera;
an audio sensor for receiving an audio command of a user indicative of the object to be dimensioned;
a first indicator displayed on the display indicative of a first desired position of the object to be dimensioned;
a second indicator displayed on the display indicative of a second desired position of the object to be dimensioned; and
a processor for receiving the scene acquired by the camera, the first indicator, and the second indicator, and for determining one or more dimensions of the object to be dimensioned;
wherein the first indicator and the second indicator are automatically positioned by the processor relative to the first and second desired positions of the object to be dimensioned as identified by the audio command, and wherein a user input comprising manipulation of a touch screen of the display of the dimensioning device may be employed to perform one or more operations selected from the group of:
adjusting the position of one or more of the first and second indicators,
positioning a mask so that the corner of the object to be dimensioned is exposed,
positioning a zone selector to encompass a plurality of objects presented in the acquired scene, and
providing a position and expected angle of the dimensioning device relative to the object to be dimensioned in a scene.

2. The system of claim 1, wherein the user input comprises manipulation of a hardware input mechanism.

3. The system of claim 1, wherein the manipulation of the touch screen comprises positioning one or more of the first and second indicators at a corner of the object to be dimensioned.

4. The system of claim 1, wherein the manipulation of the touch screen comprises positioning a zone selector encompassing a corner of the object to be dimensioned.

* * * * *